US008937034B2

(12) United States Patent
Svoboda et al.

(10) Patent No.: US 8,937,034 B2
(45) Date of Patent: Jan. 20, 2015

(54) VISCOELASTIC SURFACTANT BASED WELLBORE FLUIDS AND METHODS OF USE

(75) Inventors: Charles Svoboda, Katy, TX (US); LaTosha Moore, Richmond, TX (US); Frank E. Evans, The Woodlands, TX (US)

(73) Assignee: M-I L.L.C., Houston, TX (US)

( * ) Notice: Subject to any disclaimer, the term of this patent is extended or adjusted under 35 U.S.C. 154(b) by 501 days.

(21) Appl. No.: 12/811,478

(22) PCT Filed: Jan. 7, 2009

(86) PCT No.: PCT/US2009/030305
§ 371 (c)(1),
(2), (4) Date: Jul. 1, 2010

(87) PCT Pub. No.: WO2009/089267
PCT Pub. Date: Jul. 16, 2009

(65) Prior Publication Data
US 2010/0294498 A1    Nov. 25, 2010

Related U.S. Application Data

(60) Provisional application No. 61/020,274, filed on Jan. 10, 2008.

(51) Int. Cl.
*C09K 8/08* (2006.01)
*E21B 43/16* (2006.01)

(52) U.S. Cl.
CPC ............... *C09K 8/08* (2013.01); *C09K 2208/18* (2013.01); *C09K 2208/30* (2013.01)
USPC ........... 507/111; 507/128; 507/129; 507/131; 507/212; 507/235; 507/240; 507/244; 507/245; 507/267; 507/274

(58) Field of Classification Search
None
See application file for complete search history.

(56) References Cited

U.S. PATENT DOCUMENTS

| | | | | |
|---|---|---|---|---|
| 3,724,548 A * | 4/1973 | Parker et al. | ................... | 166/275 |
| 4,662,448 A | 5/1987 | Ashford et al. | | |
| 4,822,500 A | 4/1989 | Dobson, Jr. et al. | | |
| 4,997,581 A * | 3/1991 | Williamson et al. | .......... | 507/212 |
| 5,032,297 A * | 7/1991 | Williamson et al. | .......... | 507/201 |
| 5,851,959 A * | 12/1998 | Bernu | ............................ | 507/111 |
| 6,258,859 B1 * | 7/2001 | Dahayanake et al. | ........... | 516/77 |
| 6,325,149 B1 | 12/2001 | Dobson, Jr. et al. | | |
| 6,367,548 B1 | 4/2002 | Purvis et al. | | |
| 6,763,888 B1 | 7/2004 | Harris et al. | | |
| 6,790,812 B2 | 9/2004 | Halliday et al. | | |
| 7,125,825 B2 | 10/2006 | Moss | | |
| 2002/0169085 A1 * | 11/2002 | Miller et al. | ................... | 507/200 |
| 2003/0191029 A1 | 10/2003 | Dino | | |
| 2004/0082484 A1 | 4/2004 | Dahayanake et al. | | |
| 2006/0079406 A1 | 4/2006 | Dobson et al. | | |
| 2006/0266522 A1 | 11/2006 | Eoff et al. | | |

FOREIGN PATENT DOCUMENTS

| | | |
|---|---|---|
| EA | 004614 | 6/2004 |
| EP | 852235 A2 | 7/1998 |
| EP | 2 245 105 B1 | 5/2014 |
| WO | 98/56497 A1 | 12/1998 |
| WO | WO 9856497 A1 * | 12/1998 |
| WO | 99/52990 A1 | 10/1999 |
| WO | 02070862 A1 | 9/2002 |
| WO | 2006124826 A1 | 11/2006 |

OTHER PUBLICATIONS

Office Action issued in corresponding Eurasian Application No. 201070836 dated Nov. 25, 2011 (4 pages).
Examiner's Report issued in the corresponding Australian Application No. 2009204201 dated Jan. 17, 2011 (2 pages).
Office Action issued in corresponding Chinese Application No. 200980101920.X dated Jun. 14, 2012 (11 pages).
Office Action issued in Eurasian Application No. 201070836 dated Jul. 24, 2012 (6 pages).
Office Action issued in corresponding Canadian Application No. 2,711,515 dated Sep. 6, 2011 (3 pages).
Office Action issued in corresponding European Application No. 09700488.1 dated Sep. 12, 2011 (7 pages).
Second Office Action (w/translation) issued Oct. 30, 2012 in corresponding Chinese application No. 200980101920.X (11 pages).
International Search Report from PCT/US2009/030305 dated Jul. 28, 2009 (4 pages).
Written Opinion from PCT/US2009/030305 dated Jul. 28, 2009 (5 pages).
Office Action issued in corresponding Eurasian Application No. 201070836 dated Apr. 24, 2013 (4 pages).
Communication pursuant to Article 94(3) EPC issued Aug. 30, 2013 in corresponding European Patent application No. 09700488.1 (5 pages).
Office Action in counterpart Argentine Patent Application No. P090100069 with English correspondence, mailed May 28, 2014 (2 pages).
Office Action issued Nov. 7, 2013 in corresponding Mexican application No. MX/a/2010/007549 (w/explanatory correspondence) (7 pages).
Notice of Readiness to Grant issued Nov. 22, 2013 in corresponding Eurasian patent application 201070836 (w/explanatory correspondence) (13 pages.
Office Action issued in counterpart Mexican application No. MX/E/2010/007549 mailed Apr. 8, 2014 (3 pages).
Communication Under Rule 71(3) EPC issued Nov. 25, 2013 in corresponding European application No. 09700488.1 (7 pages).

* cited by examiner

*Primary Examiner* — John J Figueroa
(74) *Attorney, Agent, or Firm* — Osha Liang LLP

(57) ABSTRACT

A wellbore fluid that includes an aqueous based fluid; an amphoteric, viscoelastic surfactant; and a modified starch is disclosed. Methods of drilling subterranean wells, methods of reducing the loss of fluid out of subterranean wells, and methods of completing wellbores using aqueous-based fluids having an ampoteric, viscoelastic surfactant and a modified starch are also disclosed.

21 Claims, No Drawings

VISCOELASTIC SURFACTANT BASED WELLBORE FLUIDS AND METHODS OF USE

BACKGROUND OF INVENTION

1. Field of the Invention

Embodiments disclosed herein relate generally to wellbore fluids. In particular, embodiments disclosed herein relate to aqueous based wellbore fluid that may find particular use in drilling a wellbore through a producing interval of the formation.

2. Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

However, another wellbore fluid used in the wellbore following the drilling operation is a completion fluid. Completion fluids broadly refer any fluid pumped down a well after drilling operations have been completed, including fluids introduced during acidizing, perforating, fracturing, work-over operations, etc. A drill-in fluid is a specific type of drilling fluid that is designed to drill and complete the reservoir section of a well in an open hole, i.e., the "producing" part of the formation. Such fluids are designed to balance the needs of the reservoir with drilling and completion processes. In particular, it is desirable to protect the formation from damage and fluid loss, and not impede future production. Most drill-in fluids contain several solid materials including viscosifiers, drill solids, and additives used as bridging agents to prevent lost circulation and as barite weighting material to control pressure formation.

During drilling, the filtercake builds up as an accumulation of varying sizes and types of particles. This filtercake must be removed during the initial state of production, either physically or chemically (i.e., via acids, oxidizers, and/or enzymes). The amount and type of drill solids affects the effectiveness of these clean up treatments. Also affecting the effectiveness of the clean up of the wellbore prior to production is the presence of polymeric additives, which may be resistant to degradation using conventional breakers.

Designing drill-in fluids which can guarantee minimum invasion into the reservoir rock is necessary for open hole completion wells. The industry has proposed several ideas to deal with the problem, most of them based on adding bridging agents to the fluid formulation. Such agents would block pores near the well bore and, consequently, prevent additional fluid to invade the rock.

Examples of formations in which problems often arise are highly permeable and/or poorly consolidated formation and thus a technique known as "under-reaming" may be employed. In conducting the under-reaming process, the wellbore is drilled to penetrate the hydrocarbon-bearing zone using conventional techniques. A casing generally is set in the wellbore to a point just above the hydrocarbon-bearing zone. The hydrocarbon-bearing zone then may be re-drilled to a wider diameter, for example, using an expandable under-reamer that increases the diameter of the wellbore. Under-reaming usually is performed using such special "clean" drilling fluids, drill-in fluids. Typically the drill-in fluids used in under-reaming are aqueous, dense brines that are viscosified with a gelling and/or cross-linked polymer to aid in the removal of formation cuttings. However, the expense of such fluids limits their general use in the drilling process.

When the target subterranean formation has a high permeability a significant quantity of the drilling fluid may be lost into the formation. Once the drilling fluid is lost into the formation, it becomes difficult to remove. Removal of the aqueous based well fluids is desired to maximize the production of the hydrocarbon in the formation. It is well known in the art that calcium- and zinc-bromide brines can form highly stable, acid insoluble compounds when reacted with the formation rock itself or with substances contained within the formation. These reactions often may substantially reduce the permeability of the formation to any subsequent out-flow of the desired hydrocarbons. As should be well known in the art, it is widely and generally accepted that the most effective way to prevent such damage to the formation is to limit fluid loss into the formation. Thus, providing effective fluid loss control is highly desirable to prevent damaging the hydrocarbon-bearing formation. For example such damage may occur during, completion, drilling, drill-in, displacement, hydraulic fracturing, work-over, packer fluid emplacement or maintenance, well treating, or testing operations.

One class of viscosifiers commonly used in the petroleum industry comprises polymeric structures starting with molecular weights of hundreds of thousands to several million grams per mole. These large, chemically bonded structures are often crosslinked to further increase molecular weight and effective viscosity per gram of polymer added to the fluid. Such types of viscosifiers include polymeric additives resistant to biodegration, extending the utility of the additives for the useful life of the mud. Specific examples of biodegradation resistant polymeric additives employed include biopolymers, such as xanthans (xanthan gum) and scleroglucan; various acrylic based polymers, such as poly-acrylamides and other acrylamide based polymers; and cellulose derivatives, such as dialkylcarboxymethylcellulose, hydroxyethylcellulose and the sodium salt of carboxy-methylcellulose, guar gum, phosphomannans, scleroglucans, glucans, and dextrane.

Because of the high temperature, high shear (caused by the pumping and placement), high pressures, and low pH to which well fluids are exposed ("stress conditions"), the polymeric materials used to form fluid loss pills and to viscosify the well fluids tend to degrade rather quickly. In particular, for many of the cellulose and cellulose derivatives (such as HEC) used as viscosifiers and fluid control loss agents, significant degradation occurs at temperatures around 200° F. and higher. HEC, for example, is considered sufficiently stable to be used in an environment of no more than about 225° F. Likewise, because of the high temperature, high shear, high pressures, and low pH to which well fluids are exposed, xanthan gum is considered sufficiently stable to be used in an environment of no more than about 290 to 300° F. These large molecules are quite stable under the thermal conditions typically encountered in a subterranean reservoir. However, this thermal stability is believed to contribute to decreased well productivity. As a result, expensive and often corrosive breakers have been designed to destroy the molecular backbone of these polymeric structures. These breakers are typically oxidizers or enzymes and are at best only partially effective with typical reservoir cleanup less than 80% complete and more usually much less than 50% complete.

Accordingly, there exists a continuing need for wellbore fluids that are non-damaging to the formation and easily removed, particularly for use in drilling through a producing interval of a formation.

SUMMARY OF INVENTION

In one aspect, embodiments disclosed herein relate to a wellbore fluid that includes an aqueous based fluid; an amphoteric, viscoelastic surfactant; and a modified starch.

In another aspect, embodiments disclosed herein relate to a method of drilling a subterranean well that includes drilling the subterranean well using a rotary drilling rig and circulating a wellbore fluid in the subterranean well, wherein the wellbore fluid comprises an aqueous based continuous phase; an amphoteric, viscoelastic surfactant; and a modified starch.

In another aspect, embodiments disclosed herein relate to a method of reducing the loss of fluid out of a subterranean well that includes injecting into the subterranean well a wellbore fluid comprising: an aqueous based continuous phase; an amphoteric, viscoelastic surfactant; and a modified starch.

In yet another aspect, embodiments disclosed herein relate to a method of completing a wellbore that includes drilling the wellbore with a wellbore fluid to form a filter cake on the walls thereof, the wellbore fluid comprising: an aqueous based continuous phase; an amphoteric, viscoelastic surfactant; and a modified starch; emplacing a breaker fluid into the wellbore; and shutting in the well for a period of time sufficient to initiate breaking of the filter cake.

Other aspects and advantages of the invention will be apparent from the following description and the appended claims.

DETAILED DESCRIPTION

In one aspect, embodiments disclosed herein relate to wellbore fluids. In particular, embodiments disclosed herein relate to aqueous based wellbore fluid that may find particular use in drilling a wellbore through a producing interval of the formation.

As discussed above, when drilling a wellbore, a fluid typically requires a viscosifier, which may be, for example, biopolymers such as xanthan, guar or scleroglucan gum in water-based fluids, to provide enhanced viscosity and viscosity control, increased gel strength, and/or suspension and removal of drilling cuttings during drilling operations. Further, some viscosifiers such as xanthan may also act as fluid loss control agent, in addition to providing rheological properties. As a result, a filter cake may be formed on the wellbore wall that includes such polymeric additives therein. Even after attempting to break such a filter cake prior to initiating production of the well, residual polymer frequently remains on the walls. Thus, such residual polymer may have deleterious effects on the formation, and on production of hydrocarbons residing therein.

Thus, in accordance with embodiments of the present disclosure, a water-based wellbore fluid may be formulated with at least one viscoelastic surfactant and a modified starch to achieve the combined rheological, fluid loss, and clean-up properties without incorporating biopolymers. Methods of drilling at least one interval using such fluids and methods of completing and producing a well drilled with such a fluid are also disclosed herein. Further, while the fluids of the present disclosure may be particularly suitable for use in drilling a producing interval of a wellbore, one skilled in the art would appreciate that no limitation on the scope of the present invention exists. Rather, such fluids may be used to drill any (and all) intervals of a wellbore irrespective of whether the interval corresponds to the producing or "pay zone" section.

To achieve the rheological properties desired for the fluids of the present disclosure, at least one amphoteric, viscoelastic surfactant may be provided in the fluid. The term "amphoteric" refers to a compound that can act either as an acid or a base. Viscoelastic surfactants, generally, are relatively small molecules with each molecule being typically less than 500 grams per mole (i.e., molecular weight less than 500). These small molecules will associate under certain conditions to form structures which resemble the polymer molecules but which are not stable structures. The individual molecules of surfactant may rather associate to form rod-like or spiraling-cylinder-like micelles.

By incorporating a viscoelastic surfactant in a fluid, the fluid may be rendered viscoelastic. Viscoelastic fluids are those in which the application of stress gives rise to a strain that approaches its equilibrium value relatively slowly. Therefore, viscoelastic fluids may behave as a viscous fluid or an elastic solid, depending upon the stress on the system. Viscoelasticity in fluids caused by surfactants can manifest itself in shear rate thinning behavior. For example, when such a fluid is being pumped downhole, the fluid exhibits low viscosity, whereas the fluid returns to its more viscous state when the shearing force is abated. This shear thinning effect may result from the structure of the individual surfactant molecules, and the tendency of those molecules to form rod-link or spiraling cylinder-like micelles. Thus, the incorporation of a viscoelastic surfactant may allow for a fluid to behave as a viscous fluid under low shear, and a low viscosity fluid under a higher shear. A viscoelastic fluid also has an elastic component which manifests itself in yield value. This allows a viscoelastic fluid to suspend an insoluble material, for example bridging solids or drill cuttings, for a greater time period than a viscous fluid of the same apparent viscosity to prevent gravity separation. In addition, when the drilling fluid is under shear conditions and a free-flowing near-liquid, it must retain a sufficiently high enough viscosity to carry all unwanted particulate matter from the bottom of the well bore to the surface.

In accordance with a particular embodiment of the present disclosure, the viscoelastic surfactant is preferably amphoteric. Suitable amphoteric surfactants are derivatives of aliphatic quaternary ammonium, phosphonium and sulphonium compounds, wherein the aliphatic radicals contain from 8 to 18 carbon atoms, and may be straight chain or branched, and further contain an anionic water-solubilizing group, such as carboxyl, sulphonate, sulphate, phosphate or phosphonate. In particular, the amphoteric surfactant may be a compound represented by the general structure:

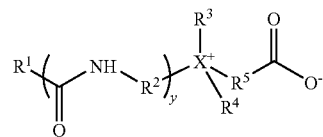

where R1, R2, R3, R4, and R5 are carbon chains, saturated or unsaturated, straight, branched, or cyclic including aromatic groups, R1 contains 8-26 carbons, R2 contains 2-10 carbons, and R3, R4, and R5 contain 1-6 carbons; X is N, S, or P, and y is 0 or 1.

In a particular embodiment, the amphoteric surfactant may be an alkyl betaine or alkylamidopropyl betaine where R1 may be derived from various fatty acids such as butyric acid (C4), caproic acid (C6), caprylic acid (C8), capric acid (C10), lauric acid (C12), mysristic acid (C14), palmitic acid (C16), stearic acid (C18), etc, in addition to unsaturated fatty acids such as myristoleic acid (C14), palmitoleic acid (C16), oleic acid (C18), linoleic acid (C18), alpha-linoleic acid (C18), erucic acid (C22), etc, or mixtures thereof. Commercial examples of such surfactants include those sold under the trade name MIRATAINE® from Rhodia, Inc. (Cranbury, N.J.) including BET-O-type (oleamidopropyl betain) and BET-E-type (eurcamidopropyl betaine) surfactants, which may be commercially available at various activities of active surfactant (e.g., 30-40%) in water with a winterizing agent such as propylene glycol. Amounts of the active amphoteric surfactant according to the present invention may range from about 0.01 to about 30%, from about 0.5 to about 10% in another embodiment, between about 1 and about 5% by weight of the wellbore fluid in yet another embodiment. However, one skilled in the art would appreciate that other amounts may be used, so long as the surfactant is present in an amount sufficient to impart the desired rheological effect by the formation of micelles within the wellbore fluid. In a particular embodiment, the amount of active amphoteric surfactant may be selected based on the low shear rate viscosity desired for the particular application.

Further, in addition to a viscoelastic surfactant, which will impart rheological properties, a modified starch may be provided in the wellbore fluid to impart desired fluid loss control properties, even at higher temperatures. The modified starches used in the fluids of the present disclosure may include chemically modified starches, including starch treated with a number of multi-functional crosslinking agents. In a particular embodiment, a chemically modified starch includes a starch having a portion of its hydroxyl groups replaced by either ester or ether groups. In particular, a portion of the hydroxyl groups may be etherified with propylene oxide to form a hydroxypropyl starch or etherified with monochloracetic acid to form a carboxymethyl starch; however, other alkoxylated or starch esters such as starch acetates may alternatively be used. Further, one skilled in the art would appreciate that other modifications are also envisioned. In a particular embodiment, a modified starch for use in a wellbore fluid of the present disclosure may include a starch etherified using propylene oxide in the presence of sodium hydroxide and sodium sulfate.

When a crosslinked starch is desirable, suitable crosslinking agents may include, for example, epichlorohydrin, phosphorus oxychloride, adipic-acetic anhydrides and sodium trimetaphosphate. Further, one skilled in the art would appreciate that the base material for crosslinking may be a chemically modified starch, such as a starch having a portion of its hydroxyl groups replaced by either ester or ether groups. Selection between esterified/etherified starch and/or crosslinked starch may, for example, be dependent on the particular drilling operation (and formation) in which the fluid is being used. For example, one skilled in the art would appreciate that depending on the expected temperatures (and thus requirements for temperature stability), crosslinking may provide additional thermal stability to the starch.

The starches which may be used as the base material in the modified starches include starches derived from any plant source such as corn, wheat, rice, tapioca, sago, waxy maize, waxy rice, sorghum, potato, pea, roots containing a high starch content, etc. Starch consists of linked anhydro-D-glucose units having either a mainly linear structure (amylose) or a branched structure (amylopectin). However, one skilled in the art would appreciate that a single plant species may exist with certain proportions of amylose and amylopectin, and that hybrids with varying proportions may also exist. Further, it is known that "starch" may also refer to common starch, which contains both amylose and amylopectin molecules, or waxy starch, which is virtually all amylopectin molecules.

The crosslinked starches of the present disclosure may be prepared using known techniques by reacting starch with an appropriate crosslinking agent in aqueous solution under alkaline conditions. The crosslinked starch slurry is then dried, such as by a heated drum dryer or extruder. Further, the starch granules are gelatinized either partially or completely when dried in the known manner. The product may be milled to obtain a dry product (at a desired particle size), which may then be incorporated into wellbore fluid at the drill site.

It is well known to measure the viscosity of crosslinked starch using a C. W. Brabender Visco-Amylo Graph. Using this measuring device, the starches may be crosslinked to provide a Brabender peak viscosity of about 800 to about 1250, preferably about 920 to about 1150 Brabender units after about 40 to about 70 minutes at about 92° C. One skilled in the art would appreciate that the amount of crosslinking agent used to achieve this degree of crosslinking will vary somewhat depending of the conditions and materials used. Typically, the amount of crosslinking agent used may range from about 0.05% to 0.15% by weight of the starch; however, one skilled in the art would appreciate that the amount may vary depending on the reagent used, the reaction conditions, the type of starch, and the desired degree of crosslinking, for example.

The cross-linked starches of the present invention are employed in subterranean treatment fluids in an effective amount to provide fluid loss control and educe fluid loss over a broad temperature range. The effective amount of cross-linked starches will vary depending on the other components of the subterranean treatment fluid, as well as the geological characteristics and conditions of the subterranean formation in which it is employed. Typically, the cross-linked starch fluid loss control additive may be used in an amount of from about 1 pound to about 10 pounds (lbs) of starch per barrel (bbl) of the subterranean treatment fluid, preferably from about 3 to about 6 pounds per barrel.

Aqueous fluids that may form the continuous phase of the viscoelastic fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium. Further, when greater temperature stability is desired, one skilled in the art would appreciate that it may be desirable to include water miscible solvents such as various glycols to improve the thermal stability of the fluid system.

Further, in a particular embodiment, at least one solid material, such as a bridging agent or weighting agent, may be included in the wellbore fluids of the present disclosure. Bridging agents, weighting agents or density materials suitable for use in some embodiments include galena, hematite, magnetite, iron oxides, illmenite, barite, siderite, celestite, dolomite, calcite, and the like. Alternatively, such materials may also include fibrous cellulosic materials, graphite, coke, perlite, etc. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon. In a particular embodiment, calcium carbonate may be used as a bridging agent in forming a filter cake.

Further, in a particular embodiment, a miscible amine may be used as a pH buffer and/or thermal extender to prevent acid-catalyzed degradation of polymers present in the fluid. A suitable miscible amine may include triethanolamine; however, one skilled in the art would appreciate that other miscible amines such as methyldiethanol amine (MDEA), dimethylethanol amine (DMEA), diethanol amine (DEA), monoethanol amine (MEA), or other suitable tertiary, secondary, and primary amines and ammonia could be used in the fluids of the present disclosure. Suitable amounts may range from 0.1% to 10% by weight of the miscible amine.

Other additives that are typically included in wellbore fluids include for example, fluid loss control agents, mutual solvents, wetting agents, organophilic clays, viscosifiers, surfactants, dispersants, interfacial tension reducers, mutual solvents, thinners, thinning agents and cleaning agents. The addition of such agents should be well known to one of ordinary skill in the art of formulating drilling fluids and muds.

Conventional methods may be used to prepare the fluids disclosed herein in a manner analogous to those normally used, to prepare conventional water-based drilling fluids. In one embodiment, a desired quantity of water-based fluid and a suitable amount of viscoelastic surfactant and crosslinked starch as described above, are mixed together and the remaining components of the fluid added sequentially with continuous mixing.

Further, a breaker fluid may be emplaced in a wellbore drilled with the fluids of the present disclosure when clean-up/removal of a filter cake is desired. The breaker may be selectively emplaced in the wellbore, for example, by spotting the fluid through a coil tube or by bullheading. A downhole anemometer or similar tool may be used to detect fluid flows downhole that indicate where fluid may be lost to the formation. Various methods of emplacing a pill known in the art are discussed, for example, in U.S. Pat. Nos. 4,662,448, 6,325,149, 6,367,548, 6,790,812, 6,763,888, which are herein incorporated by reference in their entirety. However, no limitation on the techniques by which the breaker fluid of the present disclosure is emplaced is intended on the scope of the present application. After a period of time sufficient, i.e., several days, to allow for disruption or fragmentation of the filter cake and the fluid may be returned to the surface for collection and subsequent recovery techniques. Subsequent washes of the wellbore with wash fluids may be desirable to ensure complete removal of filter cake material remaining therein. Various types of breakers are known in the art, and no limitation is intended on the type of breaker(s) that may be used to disrupt filtercakes formed from wellbore fluids of the present disclosure. Rather, it is envisioned that any of enzyme, solvent, chelant, acidizing, or oxidizing breakers may be used in breaking such filtercakes. In a particular embodiment, it may be desirable to include an enzyme/solvent/acid breaker combination for breaking the crosslinked starch, viscosified surfactant, and bridging solids.

EXAMPLES

An exemplary fluid and comparative sample fluid (formulated with conventional xanthan viscosifier) were formulated having the following components, as shown below in Table 1. Specifically, the components include ECF-975, an alkylamidopropyl betaine, SAFECARB®, a calcium carbonate bridging solid, ECF-1758, a crosslinked potato starch, FLOVIS PLUS™, xanthan gum, and FLOTROL™, a starch derivative, all of which are available from M-I LLC (Houston, Tex.). The fluids were formulated by mixing with a Hamilton Beach mixer for 10-30 min.

TABLE 1

| Fluid 1 | | Fluid 2 | |
|---|---|---|---|
| 9.2 ppg NaCl (lb/bbl) | 350.9 | Tap Water (lb/bbl) | 308.0 |
| Dry KCl (lb/bbl) | 10.7 | starch derivative (lb/bbl) | 1.25 |
| ECF-975 (lb/bbl) | 1.0 | Dry NaCl (lb/bbl) | 42.0 |
| ethanolamine (lb/bbl) | 0.6 | xanthan gum (lb/bbl) | 6.0 |
| SAFECARB ® 2 (lb/bbl) | 14.0 | MgO (lb/bbl) | 0.5 |
| SAFECARB ® 10 (lb/bbl) | 21.0 | SAFECARB ® 40 (lb/bbl) | 50 |
| ECF-1758 (lb/bbl) | 8.0 | Greencide | 0.1 |

Rheological properties were determined using a Fann Model 35 viscometer, available from Fann Instrument Company. Fluid loss was measured with a saturated API high temperature, high pressure (HTHP) cell. The results are shown below in Table 2.

TABLE 2

| | Initial Fluid 1 | Post Heat Aging Fluid 1 | Initial Fluid 2 | Post Heat Aging Fluid 2 |
|---|---|---|---|---|
| Rheology Temp (120° F.) | 120 | 120 | 120 | 120 |
| 600 rpm | 61 | 53 | 51 | 57 |
| 300 rpm | 45 | 35 | 39 | 45 |
| 200 rpm | 40 | 30 | 34 | 40 |
| 100 rpm | 32 | 20 | 28 | 31 |
| 6 rpm | 16 | 14 | 13 | 15 |
| 3 rpm | 11 | 10 | 11 | 12 |
| GELS 10" (lbs/100 ft$^2$) | 10 | 5 | 10 | 12 |
| GELS 10' (lbs/100 ft$^2$) | 11 | 8 | 13 | 15 |
| Apparent Viscosity (cP) | 30.5 | 26.5 | 25.5 | 28.5 |
| Plastic Viscosity (cP) | 16 | 18 | 12 | 12 |
| Yield Point (lbs/100 ft$^2$) | 29 | 17 | 27 | 33 |
| LSRV  1 min (cps) | 93980 | 52389 | 38782 | 37292 |
| 2 min (cps) | 90381 | 51989 | 40891 | 38192 |
| 3 min (cps) | 94382 | 49989 | 40992 | 38492 |
| API Fluid Loss (mL) | — | 4.6 | — | 3.8 |
| pH | 8.82 | 9.20 | 9.06 | 9.18 |
| Mud Weight | 9.7 | 9.7 | 9.73 | 9.73 |

Filter cakes built from the above fluids were subjected to a modified High Temperature High Pressure (HTHP) Filtration test. The HTHP Filtration test uses a HTHP cell fitted with a fitted disc as a porous medium, on which a filter cake is built. In this example, the filter cakes were built on 20 micron disks. Upon application of 500 psi at 180° F. to the disks of filter cake, effluent was collected as shown in Table 3.

TABLE 3

| | Post Heat Aging Fluid 1 | Post Heat Aging Fluid 2 |
|---|---|---|
| Spurt | 4.4 | 3.8 |
| 1 min | 2.0 | 1.6 |
| 4 min | 3.6 | 2.6 |
| 9 min | 4.8 | 2.6 |
| 16 min | 6.0 | 4.6 |
| 25 min | 6.8 | 5.8 |
| 30 min | 7.4 | 6.4 |
| 36 min | 7.8 | 6.8 |
| 30 min doubled | 14.8 | 12.8 |
| Modified HTHP Fluid Losa thickness | 19.2 ¹⁄₁₆" | 16.6 ¹⁄₁₆" |

Further, contamination effects on Fluid 1, including lubricant, inert solids, and clay were tested. KLASTOP™ is a polyether amine additive that inhibits clay hydration, which is commercially available from M-I LLC (Houston, Tex.) The contamination amounts are shown below in Table 4.

TABLE 4

| | Fluid 1 + Lub | Fluid 1 + Inert Solids | Fluid 1 + Clay | Fluid 1 + Clay + KLASTOP | Fluid 1 + Solids + Lub |
|---|---|---|---|---|---|
| Fluid 1 | 339.5/394.2 | 339.5/394.2 | 339.5/394.2 | 339.5/394.2 | 339.5/394.2 |
| STARGLIDE lubricant (3% v/v) | 10.5/9.5 | — | — | — | 10.5/9.5 |
| Rev Dust (3% v/v) | — | 17 | — | — | 17 |
| Silica Flour (3% v/v) | — | 10.3 | — | — | 10.3 |
| Hymod Clay (3%) | — | — | 27.3 | 27.3 | — |
| KLASTOP (3% v/v) | — | — | — | 10.5/9.5 | — |

The rheological properties of the contaminated fluids were tested and are shown below in Table 5.

TABLE 5

| | Fluid 1 + Lub | Fluid 1 + Inert Solids | Fluid 1 + Clay | Fluid 1 + Clay + KLASTOP | Fluid 1 + Solids + Lub |
|---|---|---|---|---|---|
| Rheology Temp (120° F.) | 120 | 120 | 120 | 120 | 120 |
| 600 rpm | 39 | 48 | 90 | 82 | 34 |
| 300 rpm | 25 | 30 | 62 | 59 | 20 |
| 200 rpm | 20 | 25 | 49 | 50 | 16 |
| 100 rpm | 13 | 17 | 34 | 40 | 10 |
| 6 rpm | 5 | 5 | 12 | 19 | 4 |
| 3 rpm | 3 | 4 | 10 | 16 | 3 |
| GELS 10" (lbs/100 ft$^2$) | 3 | 4 | 8 | 15 | 3 |
| GELS 10' (lbs/100 ft$^2$) | 4 | 5 | 15 | 18 | 4 |
| Apparent Viscosity (cP) | 19.5 | 24 | 45 | 41 | 17 |
| Plastic Viscosity (cP) | 14 | 18 | 28 | 23 | 14 |
| Yield Point (lbs/100 ft$^2$) | 11 | 12 | 34 | 36 | 6 |
| LSRV    1 min (cps) | 3199 | 21095 | 82482 | — | 8398 |
|            2 min (cps) | 3099 | 19496 | 95280 | 77983 | 8298 |
|            3 min (cps) | 3199 | 17396 | 92381 | 71585 | 7998 |
| API Fluid Loss (mL) | 2 | 3.4 | 3.4 | 2.8 | 2.2 |
| pH | 9.24 | 9.43 | 9.23 | 9.57 | 9.06 |
| Mud Weight | 9.62 | 10.03 | 10.03 | 9.97 | 9.97 |

Additionally, the modified HTHP filtration test was also performed on the contaminated fluid. The results are shown in Table 6.

TABLE 6

| | Fluid 1 + Lub | Fluid 1 + Inert Solids | Fluid 1 + Clay | Fluid 1 + Clay + KLASTOP | Fluid 1 + Solids + Lub |
|---|---|---|---|---|---|
| Spurt | 9.4 | 2.0 | 32.2 | 5.4 | 1.8 |
| 1 min | 0.4 | 2.2 | 1.8 | 2.2 | 1.6 |
| 4 min | 1.6 | 2.8 | 3.2 | 3.4 | 3.0 |
| 9 min | 2.2 | 4.0 | 4.4 | 5.0 | 3.4 |
| 16 min | 2.8 | 5.0 | 5.4 | 6.2 | 4.2 |
| 25 min | 3.4 | 6.0 | 6.2 | 7.4 | 4.8 |
| 30 min | 3.8 | 6.6 | 7.4 | 8.2 | 5.0 |
| 36 min | 4.0 | 7.0 | 8.2 | 8.6 | 5.4 |
| 30 min doubled | 7.6 | 13.2 | 14.8 | 16.4 | 10.0 |

TABLE 6-continued

| | Fluid 1 + Lub | Fluid 1 + Inert Solids | Fluid 1 + Clay | Fluid 1 + Clay + KLASTOP | Fluid 1 + Solids + Lub |
|---|---|---|---|---|---|
| Modified HTHP Fluid Loss | 17.0 | 15.2 | 47.0 | 21.8 | 11.8 |
| thickness | 1/16" | 2/16" | 3/16" | 2/16" | 1/16" |

A breaker fluid was formulated as shown below in Table 7. Specifically, the components include D-SOLVER™, a chelating agent, WELLZYME® A, an enzyme breaker, and D-SPERSE™, a surfactant, all of which are available from M-I LLC (Houston, Tex.)

TABLE 7

| Component | Amount (mL/g) per bbl | pH |
|---|---|---|
| 9.0 ppg KCl | 66.3/71.6 | |
| D-SOLVER ™ | 262.5/305.8 | 4.84 |
| KOH pH to 5 | 0.125 | 5.04 |
| WELLZYME ® A | 17.5/19.7 | |
| D-SPERSE ™ | 1.8/1.9 | 4.87 |

Breaking of filter cake built from Fluids 1 were tested as follows. 20 micron discs were pre-soaked with 3% KCl, loaded into a modified HTHP cell, which was filled with 3% KCl. The closed cell was placed in a Flow Back tester, where the amount of time for 200 mL to pass through the disc in the production and injection at 5 psi was performed. The KCl was decanted off and the cells were filled with the fluids. A pressure of 500 psi was applied to the cells and the temperature was allowed to reach 180° F. After reaching 180° F., a fluid loss test was performed for 4 hours, and the filtrate collections recorded. Excess fluid was decanted/removed from the cell, and the breaker fluid shown in Table 7 was added thereto. A pressure of 500 ps for 30 min (or until 30 mL of effluent was collected) was applied. The pressure was reduced to 50 psi and the cell was shut in, allowing the filter cake to soak for 72 hours at 180° F. with 50 psi. After 72 hours, the residual breaker was decanted from the cell, and the cell was filled with 3% KCl. The time for 200 mls to flow in the production and injection directions was measured at 5 psi. Fluid 1 shows Return to Flow percentages of 97.6 and 99.1% for production and injection rates, respectively.

Advantageously, embodiments of the present disclosure may provide for at least one of the following. Wellbore fluids of the present disclosure may find particular use for drilling through producing intervals of a formation, where it may be particularly desirable to increase clean-up abilities, to maximize hydrocarbon recovery. In particular, the fluids of the present disclosure may be particularly desirable for drilling such target intervals based on the rheological properties, ease of removal, flowback qualities (including slight stimulation of well, increasing flowback), and compatability with completion techniques. Further, desirable rheological properties include 1) the viscosity at high shear values is sufficiently low to guarantee low pressure drops during drilling and 2) the gel and viscosity values at low shear values are sufficiently high to keep the cuttings in suspension when the fluid circulation is stopped, thus avoiding the formation of deposits. As described above, the cross-linked starch fluid loss additives of this invention provide good fluid loss control over a broad temperature range and in an environment where salinity, shear and high temperature tolerance are often required.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A wellbore fluid, comprising:
   an aqueous based fluid;
   an amphoteric, viscoelastic surfactant; and
   a modified potato starch, wherein the modified starch comprises a potato starch treated with a crosslinking agent.

2. The wellbore fluid of claim 1, further comprising:
   bridging particles.

3. The wellbore fluid of claim 1, wherein the amphoteric surfactant comprises a compound represented by the general structure:

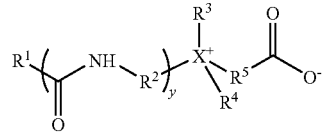

where R1, R2, R3, R4, and R5 are carbon chains, saturated or unsaturated, straight, branched, or cyclic including aromatic groups, R1 contains 8-26 carbons, R2 contains 2-10 carbons, and R3, R4, and R5 contain 1-6 carbons; X is N, S, or P, and y is 0 or 1.

4. The wellbore fluid of claim 3, wherein the amphoteric surfactant comprises at least one alkylamidopropyl betaine.

5. The wellbore fluid of claim 1, wherein the modified starch comprises at least one of etherification, esterification, crosslinking, or combinations thereof.

6. The wellbore fluid of claim 1, wherein the modified potato starch comprises a potato starch crosslinked with at least one of epichlorohydrin, phosphorus oxychloride, adipic-acetic anhydrides and sodium trimetaphosphate.

7. The wellbore fluid of claim 1, wherein the aqueous based fluid comprises fresh water, sea water, brine, mixtures of water and water-soluble organic compounds and mixtures thereof.

8. The wellbore fluid of claim 1, further comprising:
   at least one miscible amine.

9. A method of drilling a subterranean well, comprising:
   drilling the subterranean well using a rotary drilling rig and circulating a wellbore fluid in the subterranean well, wherein the wellbore fluid comprises:
   an aqueous based continuous phase;
   an amphoteric, viscoelastic surfactant; and
   a modified potato starch.

10. The method of claim 9, wherein the wellbore fluid is used to drill a producing interval of the well.

11. The method of claim 10, wherein a different wellbore fluid is used to drill the well prior to the producing interval.

12. The method of claim 9, wherein the amphoteric surfactant comprises a compound represented by the general structure:

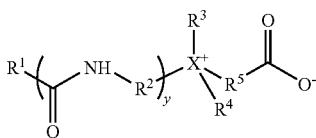

where R1, R2, R3, R4, and R5 are carbon chains, saturated or unsaturated, straight, branched, or cyclic including aromatic groups, RI contains 8-26 carbons, R2 contains 2-10 carbons, and R3, R4, and R5 contain 1-6 carbons; X is N, S, or P, and y is 0 or 1.

13. A method of reducing the loss of fluid out of a subterranean well, comprising:
injecting into the subterranean well a wellbore fluid comprising:
an aqueous based continuous phase;
an amphoteric, viscoelastic surfactant; and
a modified potato starch.

14. The method of claim 13, wherein the amphoteric surfactant comprises a compound represented by the general structure:

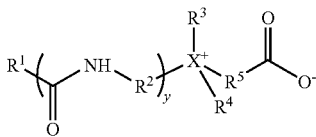

where R1, R2, R3, R4, and R5 are carbon chains, saturated or unsaturated, straight, branched, or cyclic including aromatic groups, R1 contains 8-26 carbons, R2 contains 2-10 carbons, and R3, R4, and R5 contain 1-6 carbons; X is N, S, or P, and y is 0 or 1.

15. A method of completing a wellbore, comprising:
drilling the wellbore with a wellbore fluid to form a filter cake on the walls thereof, the wellbore fluid comprising:
an aqueous based continuous phase;
an amphoteric, viscoelastic surfactant; and
a modified potato starch;
emplacing a breaker fluid into the wellbore; and
shutting in the well for a period of time sufficient to initiate breaking of the filter cake.

16. The method of claim 15, further comprising gravel packing at least one interval of the wellbore.

17. The method of claim 15, further comprising:
circulating a wash fluid through the wellbore prior to and/or after emplacing a breaker fluid.

18. The method of claim 15, further comprising:
collecting the breaker fluid having at least a portion of the broken invert emulsion filter cake emulsified therein.

19. The method of claim 15, further comprising:
initiating production of formation fluids through the wellbore.

20. The method of claim 15, wherein the amphoteric surfactant comprises a compound represented by the general structure:

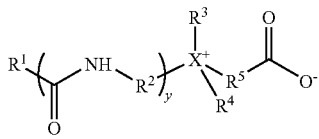

where R1, R2, R3, R4, and R5 are carbon chains, saturated or unsaturated, straight, branched, or cyclic including aromatic groups, R1 contains 8-26 carbons, R2 contains 2-10 carbons, and R3, R4, and R5 contain 1-6 carbons; X is N, S, or P, and y is 0 or 1.

21. The wellbore fluid of claim 1, further comprising at least one amine selected from the group consisting of triethanolamine, methyldiethanol amine, dimethylethanol amine, diethanol amine, and monoethanol amine.

* * * * *